Oct. 8, 1935.  W. NILSSON  2,016,612
APPARATUS FOR THE MANUFACTURE OF CHEESE
Filed Aug. 7, 1931  2 Sheets-Sheet 1
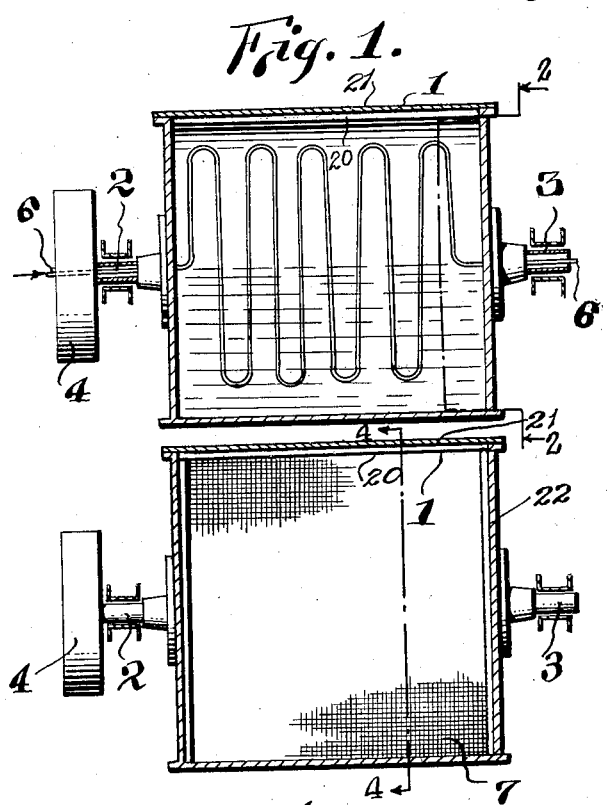
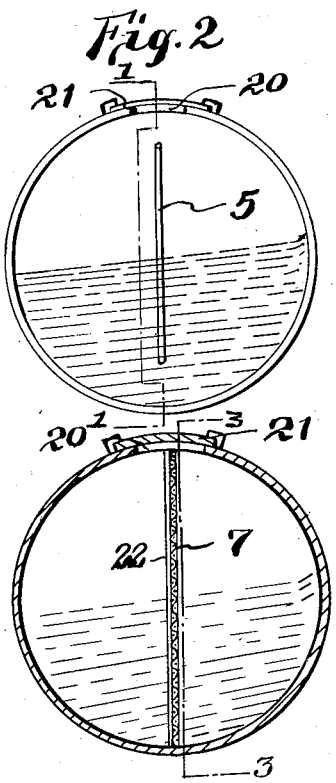
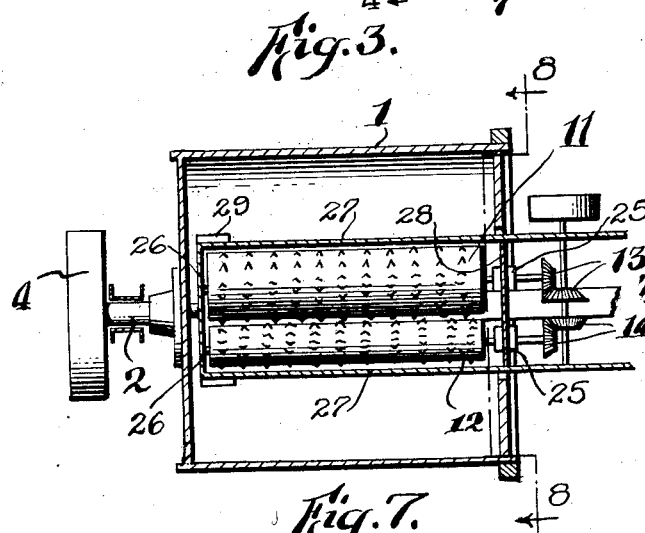
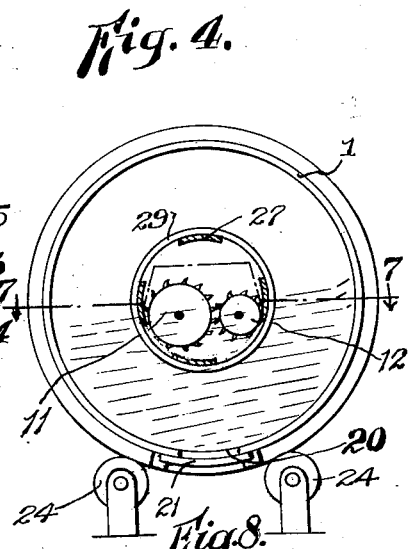
W. Nilsson
INVENTOR
By: Markst Clerk
Attys.

Oct. 8, 1935.  W. NILSSON  2,016,612
APPARATUS FOR THE MANUFACTURE OF CHEESE
Filed Aug. 7, 1931  2 Sheets-Sheet 2
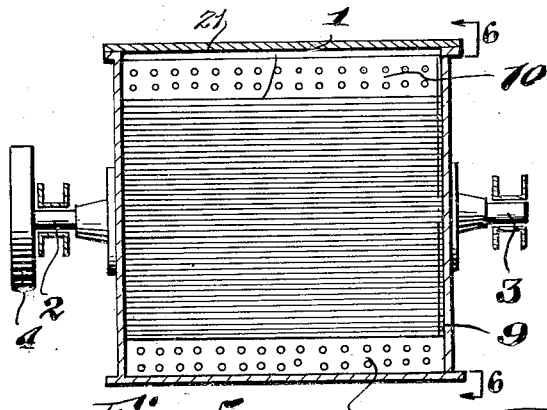
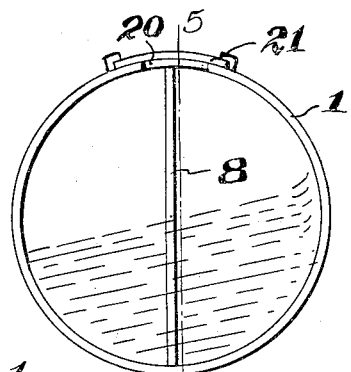
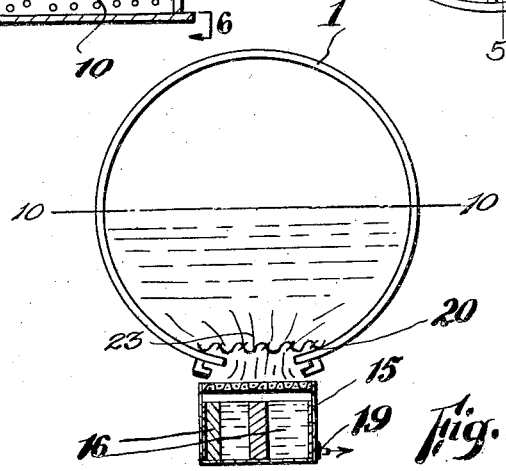
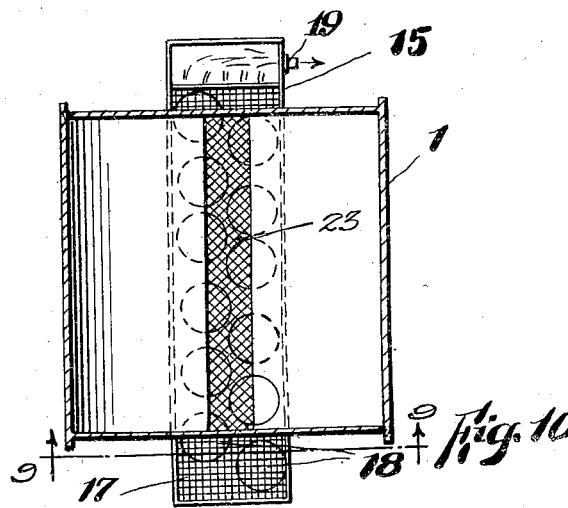
W. Nilsson
INVENTOR
By: Marks & Clerk
Attys.

Patented Oct. 8, 1935

2,016,612

UNITED STATES PATENT OFFICE 2,016,612

APPARATUS FOR THE MANUFACTURE OF CHEESE

Wilhelm Nilsson, Sundsvall, Sweden

Application August 7, 1931, Serial No. 555,822
In Sweden September 13, 1930

4 Claims. (Cl. 31—46)

The present invention relates to an apparatus for the manufacture of cheese and the object of same is to provide an increased range of work and to ensure a greater effectiveness. The apparatus according to the invention essentially consists of a rotatable drum or cylinder for milk and other ingredients required for the manufacture of cheese, a pipe coil or the like, which may be fitted in or removed from the drum or cylinder and serves for conducting the tempering liquid and may be mounted in the cylinder in such a way as to permit it to partake in the rotation of the cylinder thus acting as a stirrer. Finally there are cheese cutting and dividing arrangements, adapted to be mounted in or removed from the drum or cylinder. Instead of the last mentioned arrangements, according to the invention, a removable mill or crushing device or the like may also be arranged above all in case of producing a cheese compound which is particularly tough and difficult to treat. According to an embodiment of the invention the cylinder or drum may have a circular cross-section and be provided with end plates. The cylinder may have one end provided with a journal bolted to the cylinder end plate and mounted to turn in a bearing on a fixed frame, the other cylinder end plate being provided with a cog-wheel for driving purposes. Other driving means may, however, be applied. Fixed to one end plate or end of the cylinder is a bearing ring supported by two rollers running in an upright frame in such a way that the corresponding end of the cylinder is supported when rotating. In the cylinder a shutter is arranged and adapted to be opened at certain stages of the process. Connected with said shutter is a thermometer; preferably it is pushed through an aperture made in the pivot of the shutter. Both of the cylinder end plates respectively, may of course have the same design, both being, for instance, provided with a trunnion or the like to support the cylinder. To allow the interior of the cylinder and the working members contained therein, to be inspected, an inspection hole or window may suitably be arranged in one of the end plates.

The cylinder casing has an opening of the same length as the cylinder, adapted to permit the working members, within the cylinder, to be exchanged; said opening may be closed by a shutter, exchangeable for a straining frame provided with a filtering-cloth, particularly to remove the whey. The drum or cylinder may be rotated in different manners: by means of a cogwheel gearing, belting or the like. The invention will now be more particularly explained in connection with the annexed drawings, which diagrammatically show an embodiment.

Figs. 1 and 2 show the drum, respectively in longitudinal section and end view, Figure 2 being a section on line 2—2 of Fig. 1 to show a pipe coil 5 mounted in the drum.

Figs. 3 and 4 are corresponding views of the drum shown in Figs. 1 and 2, a curd-knife 7 being mounted instead of the pipe coil.

Figs. 5 and 6 also are corresponding views, the drum being provided with straining frame 8 or sieve.

Figs. 7 and 8 are corresponding views, the drum having a crushing device mounted therein.

Figs. 9 and 10 show an end view and top view respectively of the drum in emptying position, a curd receiver 15 located under the same.

In the drawings, 1 is the drum, having its end plates provided with supporting journals 2 and 3 supported in suitable bearings. The journal 2 carries, in the embodiment shown, a pulley 4 to rotate the drum by means of a suitable belting. Figs. 1 and 2 show a pipe coil 5 of any suitable construction fitted in the drum. The parts of said coil may be arranged in zig-zag or symmetrical formation. The ends of the coil may pass through trunnions 2 and 3 as indicated at 6 in Fig. 1, thus permitting liquid to be supplied to the coil and removed from same during the rotation of the drum. The coil may be fixed to a frame or the like, which may be kept in guide-grooves in the end plates. The coil will, thus, partake in the rotation of the cylinder, causing a certain stirring of the contents of the cylinder.

Steam or water or any other tempering means may be conducted through one journal, circulating through the coil and being subsequently removed through the other journal, after being condensed in case of steam supply. By this arrangement it will be possible to give the liquid contained in the rotating drum a suitable temperature.

Figs. 3 and 4 show a sieve 7 mounted along a diameter in the cylinder. Said sieve may be rigidly connected with the cylinder by putting it into guide-grooves 22 in the end plates. Thus the sieve will rotate together with the drum. The sieve may consist of wires running cross-wise and placed, at will, partly horizontally and vertically, partly diagonally. By the rotation the curd compound contained in the cylinder is crumbled, the sieve thus acting as a curdknife. Figs. 5 and 6 show a combined riddle and sieve frame 8, the centre portion 9 of which is composed of wires running horizontally, the parts 10 adjacent to the cylinder casing being perforated plates. This member also effects a crushing of the curd-compound.

In case of manufacturing cheese of particularly tough and hard-worked mass a crushing device or curd-mill may, to advantage, be used, shown in Figs. 7 and 8, consisting of two rollers 11 and 12 peripherally supplied with pins or teeth the rollers being mounted at 25 and 26 within the slats 27, the slats being supported by the wall 28 and rim 29. The rollers may be rotated in opposite directions by means of bevel gears 13 and 14, as shown, or by means of other suitable gearing. The pins or teeth located on the two rollers are spaced in such a way as to avoid their knocking together during the rotation of the rollers. The peripheral speed of the two rollers should be different, which is attained by giving the rollers different diameters. During the rotation of the cylinder the curd-compound will be thrown upon the rollers, thus being crushed between them. In this latter case the cylinder is supported at one end by a pair of roller bearings 24 resting on the ground.

To discharge the contents of the cylinder after the final treatment of the curd-compound, a curd-receiver box 15 is placed under the cylinder; said receiver being divided into spaces containing curd-moulds located at will and having any desired size. This receiver is covered by a perforated plate for conducting the treated curd to the different moulds. The receiver is in Figs. 9 and 10 designated by the numeral 15 while the curd-moulds are indicated at 16, the mentioned plate 17 and the apertures in same 18. At one end of this receiver is provided a strainer for removing the whey, which may flow off through a pipe 19. Longitudinally arranged in the cylinder is an opening 20. Figure 9 may, as shown in Figures 2, 4, 6 and 8, be covered with a cover 21.

When producing cheese by means of the present apparatus the steps are as follows: The milk to be treated is poured through the opening 20 in the cylinder casing, up to three-fourths of the capacity of the drum. Heating or cooling, respectively, of the milk to a suitable temperature is effected by letting in steam, hot water or cold water or the like through the pipe coil 8 inserted in the cylinder and serving at the same time as a stirrer for the milk. During this operation the drum is rotating. Then the ingredients required for the curdling, are added, being mixed with the milk at the rotation of the drum. The drum is now stopped and the pipe coil 5 is removed, the milk mass being kept at rest during the time the curdling takes place.

When the curdling is finished the curd-knife arrangement 7 shown in Figs. 3 and 4 is passed through the opening 20 in the cylinder casing, the shutter 21 is closed and the drum slowly rotated; the curd compound thus having to pass the curd-knife is crumbled. When the crumbling operation is finished the curd-knife arrangement is removed and the coil 5 is once more inserted. The drum is further rotated, the curd compound being during this time stirred until a suitable crumbling has been obtained. Then the cleaning out is effected by letting in steam or hot water through the pipe coil. Subsequent stirring is made by continued rotation of the drum, with the coil serving as a stirrer. When this subsequent stirring is finished the whey is discharged through a filter-cloth 23 (Fig. 9); arranged in the opening of the casing.

The treatment (beating) of the curd compound then takes place. When producing cheese of a crumbly structure this treatment is effected by imparting an increased speed to the rotating drum, the curd being, in this event, thrown upwards and allowed to fall down on the coil located in the drum. Said compound will at this occasion be transformed into crumbles, the whey flowing off through the filter-cloth 23. When producing such kind of cheese in which the curd compound is particularly tough and hard-worked special rollers are used for the crushing operation, namely the rollers 11 and 12, which may be inserted into the drum through a lid arranged in one of the end plates.

The curd compound being salted and finished it is brought into the moulds 16 by removing the cover 21 and turning the drum until the opening 20 is placed downwards. The curd compound will then flow down into the moulds in question. When producing cheese having great pores, to be taken out during the curdling, the curd compound is discharged from the drum together with the whey which is strained off in the curd receiver box 17 and flows away through the pipe 19.

The invention is not limited to the embodiment shown in the drawing but it may, on the contrary, be altered in many different ways without departing from the idea upon which it is based.

I claim:

1. Apparatus for producing cheese, comprising in combination a rotatable cylindrical vessel, and a temperature regulating member mounted in the interior of said vessel, so as to partake in its rotation, the body of revolution described by said member during rotation of the vessel corresponding with respect to its volume and shape substantially to the interior space of the vessel.

2. Apparatus for producing cheese comprising in combination a rotatable cylindrical vessel and a curd cutting frame being adapted to be inserted in the interior of the vessel, so as to partake in its rotation and to be removed therefrom, the vessel being adapted to receive the curd cutting frame and maintain its position during rotation of the vessel and the curd cutting frame being of such extensions and shape that it covers substantially the whole area between the axis of the cylinder and a generatrix of the same.

3. Apparatus for producing cheese comprising in combination a rotatable cylindrical vessel and a beating member being adapted to be inserted in the interior of the vessel, so as to partake in its rotation and to be removed therefrom, the vessel being adapted to receive the beating member and maintain it in position during rotation of the vessel and the beating member being of such dimensions and shape that it covers substantially the whole area between the axis of the cylinder and a generatrix of the same.

4. Apparatus for producing cheese comprising in combination a rotatable cylindrical vessel having in its curved wall a longitudinal opening of substantial width, an implement for treating the coagulated milk, said implement being adapted to be inserted into the interior of the vessel, so as to partake in its rotation and to be removed therefrom, means within the vessel adapted to receive said implement and maintain it in a set position, during rotation of the vessel, the opening being of a length substantially equal to the length of the implement so as to permit said implement to be slid through during its insertion and removal.

WILHELM NILSSON.